United States Patent [19]

Murachi et al.

[11] Patent Number: 4,849,468

[45] Date of Patent: Jul. 18, 1989

[54] ADHESIVE COMPOSITIONS

[75] Inventors: Tatsuya Murachi; Masakazu Nakane, both of Aichi, Japan

[73] Assignee: Toyoda Gosei Co., Ltd., Nishikasugai, Japan

[21] Appl. No.: 876,209

[22] Filed: Jun. 19, 1986

[30] Foreign Application Priority Data

| Jun. 19, 1985 | [JP] | Japan | 60-133779 |
| Jun. 25, 1985 | [JP] | Japan | 60-140030 |
| Jul. 17, 1985 | [JP] | Japan | 60-157284 |
| Jul. 17, 1985 | [JP] | Japan | 60-157285 |
| Oct. 12, 1985 | [JP] | Japan | 60-227584 |
| Feb. 4, 1986 | [JP] | Japan | 61-022575 |
| Feb. 5, 1986 | [JP] | Japan | 61-023417 |
| Feb. 5, 1986 | [JP] | Japan | 61-023418 |

[51] Int. Cl.$^4$ ............. C08L 7/00; C08L 15/02; C08K 3/10; C08K 3/24

[52] U.S. Cl. ............. 524/523; 525/292; 525/227; 525/215; 525/194; 525/193; 525/187; 524/405; 524/417; 524/422; 524/429; 524/435; 524/437

[58] Field of Search ............. 525/292, 310, 918, 192, 525/227, 215; 521/533, 523

[56] References Cited

U.S. PATENT DOCUMENTS

| 2,364,589 | 12/1944 | Raynolds et al. | 524/523 |
| 2,468,480 | 4/1949 | Bradley | 525/227 |
| 3,092,250 | 6/1963 | Knutson et al. | 525/215 |
| 3,202,628 | 8/1965 | Burd | 525/227 |
| 3,594,451 | 7/1971 | Keown | 525/292 |
| 3,676,391 | 7/1972 | De Ross | 524/523 |
| 3,892,884 | 7/1975 | Garratt et al. | 525/292 |
| 3,904,708 | 9/1975 | Kennedy et al. | 525/292 |
| 3,919,153 | 11/1975 | Fischer | 524/523 |
| 3,962,372 | 6/1976 | Arhart | 524/533 |
| 4,222,923 | 9/1980 | Rhodes et al. | 524/523 |
| 4,238,577 | 12/1980 | Arendt | 525/292 |
| 4,238,578 | 12/1980 | Rim et al. | 525/292 |
| 4,439,587 | 3/1984 | Martinez et al. | 525/292 |

FOREIGN PATENT DOCUMENTS

| 46-22103 | 6/1971 | Japan . | |
| 50-7894 | 1/1975 | Japan . | |
| 50-23483 | 3/1975 | Japan . | |
| 50-142695 | 11/1975 | Japan . | |
| 53-046337 | 4/1978 | Japan | 525/309 |
| 53-27751 | 8/1978 | Japan . | |
| 57-52216 | 11/1982 | Japan . | |
| 61-181880 | 8/1986 | Japan | 525/292 |
| 61-125666 | 9/1986 | Japan | 525/292 |

OTHER PUBLICATIONS

Manson et al.–Polymer Blends and Composites–Nov. 79, pp. 235–236.
Ham–Copolymerization–1964, pp. 295, 304, 305 & 306.

*Primary Examiner*—Carman J. Seccuro
*Attorney, Agent, or Firm*—Cushman, Darby & Cushman

[57] ABSTRACT

The present invention provides adhesive compositions with strong and firm adhesion to various kinds of synthetic rubbers including polyolefin-type vulcanized rubbers and to various kinds of synthetic resins including polyolefin-type synthetic resins and vinyl chloride resins. The present adhesive compositions comprise a mixture of a chlorinated rubber, an acrylic polymer, a Lewis acid and an organic solvent or a mixture of a chlorinated rubber, an acrylic polymer, a terminal functional group-containing hydrocarbon-type polymer and an organic solvent.

1 Claim, 1 Drawing Sheet

ADHESIVE COMPOSITIONS

The present invention relates to adhesive compositions with highly strong adhesion to various kinds of synthetic rubbers including polyolefin-type vulcanized rubbers and to various kinds of synthetic resins including polyolefin-type synthetic resins and vinyl chloride resins.

BACKGROUND OF THE INVENTION

Numerous kinds of industrial rubber materials and synthetic resin materials are known, and in particular, polyolefin-type vulcanized rubbers such as ethylene-propylene-diene copolymer rubbers (EPDM) and ethylene-propylene copolymer rubbers (EPM) as well as polyolefin-type synthetic resins such as polypropylene (PP) and polyethylene (PE) have been used in various industrial fields, as these are polymers with excellent characteristics, for example, having remarkably eminent physical characteristics including weather-resistance, aging-resistance and ozone-resistance and are highly durable to a broad temperature range when actually used, as compared with natural rubbers (NR) and other various kinds of synthetic rubbers such as styrene-butadiene copolymer rubbers (SBR), polybutadiene rubbers (BR), isobutylene-isoprene copolymer rubbers (IIR), polychloroprene rubbers (CR), acrylonitrile-butadiene copolymer rubbers (NBR) and polyisoprene rubbers (IR) or various kinds of synthetic resins such as ABS resins, polystyrene resins (PS), acrylonitrile-styrene copolymer resins (AS) and ethylene-vinyl acetate copolymer resins (EVA).

However, it has been known that, when a coating material or an adhesive is applied to the surface of a base made from a raw material polymer of the above-described polyolefin-type vulcanized rubbers such as EPDM or EPM or polyolefin-type synthetic resins such as PP or PE, the coated film is apt to be peeled off with ease from the surface of the base, since these polymers have no polar group in the main chain of the molecule.

Further, it has also been known that the adhesion of the paint material or adhesive as coated on the surface of a base made from a synthetic resin such as vinyl chloride resin, which contains a large amount of a plasticizer, gradually lowers as the plasticizer incorporated therein moves up to the surface of the base, after used for a long period of time.

SUMMARY OF THE INVENTION

One object of the present invention is to provide adhesive compositions with highly strong adhesion to various kinds of synthetic rubbers including polyolefin-type vulcanized rubbers and to various kinds of synthetic resins including polyolefin-type synthetic resins and vinyl chloride resins.

Another object of the present invention is to provide primer compositions to be used in the coating of various kinds of coating materials or adhesives on the surface of various kinds of synthetic rubbers including polyolefin-type vulcanized rubbers or various kinds of synthetic resins including polyolefin-type synthetic resins and vinyl chloride resins.

Further objects of the present invention other than the above will be clarified by the description as given hereinafter and the statement of the claims as attached hereto. Further merits of the present invention which are not specifically mentioned in the present specification will be apparent to anyone skilled in the art who will actually practice the present invention.

DETAILED DESCRIPTION OF THE INVENTION

The constitutions of the present adhesive compositions will be explained in detail hereinafter.

(a) Adhesive composition comprising a mixture of a chlorinated rubber, an acrylic polymer, a Lewis acid and an organic solvent:

The chlorinated rubber is a natural rubber or a synthetic rubber containing chlorine in the molecule, for example, including chloroprene rubber, chlorinated natural rubber, chlorinated butyl rubber, chlorinated polyethylene, chlorosulfonated polyethylene, epichlorohydrin rubber and nitrile rubber/vinyl chloride resin blended rubber.

These chlorinated rubbers preferably have a molecular weight falling within the range of 5,000–100,000 and a chlorination degree of 65% or more. If the chlorination degree is less than 65%, the adhesion lowers.

The acrylic polymer is a polyacrylate or polymethacrylate. Polyacrylates include, for example, polymethyl acrylate, polyethyl acrylate, poly-n-butyl acrylate, poly-iso-butyl acrylate, poly-2-ethylhexyl acrylate, poly-iso-decyl acrylate, poly-2-hydroxyethyl acrylate, poly-2-hydroxypropyl acrylate, polyglycidyl acrylate and polydimethylaminoethyl acrylate.

Polymethacrylates include, for example, polymethyl methacrylate, polyethyl methacrylate, poly-n-butyl methacrylate, poly-iso-butyl methacrylate, poly-2-ethylhexyl methacrylate, poly-iso-decyl methacrylate, poly-2-hydroxyethyl methacrylate, poly-2-hydroxypropyl methacrylate, polyglycidyl methacrylate and polydimethylaminoethyl methacrylate.

These polyacrylates and polymethacrylates as mentioned above may be used singly or in the form of a mixture of two or more of them as properly blended.

Next, the Lewis acid includes, for example, inorganic acids such as sulfuric acid, nitric acid, nitrous acid, hydrochloric acid, phosphoric acid, phosphorous acid, pyrophosphoric acid, metaphosphoric acid, tripolyphosphoric acid, tetrapolyphosphoric acid, orthoboric acid, metaboric acid, hydrobromic acid, hydrofluoric acid, hydroiodic acid, carbonic acid and hydrogen sulfide as well as $AlCl_3$, $AlBr_3$, $AlF_3$, $GaF_3$, $InF_3$, $TlF_3$, $GaCl_3$, $PCl_2$, $PCl_5$, $SbCl_3$, $SbCl_5$, $FeCl_3$, The adhesive composition comprising the mixture of the chlorinated rubber, acrylic polymer, Lewis acid and organic solvent may be obtained merely by blending the above-exemplified chlorinated rubber, acrylic polymer and Lewis acid in an organic solvent.

The solvent to be used is properly selected from saturated hydrocarbons such as n-hexane and cyclohexane; aromatic hydrocarbons such as benzene, toluene and xylene; ethers such as dioxane and tetrahydrofuran; acetates such as ethyl acetate and propyl acetate; and ketones such as acetone, cyclohexanone and methylethylketone; and a mixture solvent comprising two or more kinds of these solvents may also be used.

The proportion in the admixture of the chlorinated rubber and the acrylic polymer is 10–500 parts by weight of the acrylic polymer to 100 parts by weight of the chlorinated rubber.

In case the content of the acrylic polymer is less than 10 parts by weight, the adhesion lowers, but on the contrary, if the content thereof is more than 500 parts by weight, the hardness of the resulting adhesive composition becomes too high, and therefore, when this is actually coated on a base, the coated film is brittle.

The Lewis acid is to be blended in a proportion of 0.1–20 parts by weight to 100 parts by weight of the total of the chlorinated rubber and the acrylic polymer. If this is less than 0.1 part by weight, the adhesion lowers, and if this is added in an amount of more than 20 parts by weight, any improvement of the adhesion cannot be expected.

(b) Adhesive composition comprising a mixture of a polymer made of a chlorinated rubber and an acrylic monomer, a Lewis acid and an organic solvent:

The same chlorinated rubbers, Lewis acids and organic solvents as exemplified above may be used.

The acrylic monomer is an acrylic acid, an acrylate, a methacrylic acid and a methacrylate. Acrylates include, for example, methyl acrylate, ethyl acrylate, n-butyl acrylate, iso-butyl acrylate, 2-ethylhexyl acrylate, iso-decyl acrylate, 2-hydroxyethyl acrylate, 2-hydroxypropyl acrylate, glycidyl acrylate and dimethylaminoethyl acrylate.

Methacrylates include, for example, methyl methacrylate, ethyl methacrylate, n-butyl methacrylate, iso-butyl methacrylate, 2-ethylhexyl methacrylate, iso-decyl methacrylate, 2-hydroxyethyl methacrylate, 2-hydroxypropyl methacrylate, glycidyl methacrylate and dimethylaminoethyl methacrylate.

These acrylic acid, methacrylic acid and esters thereof as mentioned above may be used singly or in the form of a mixture of two or more of them as properly blended.

For the preparation of the adhesive composition comprising the mixture of the copolymer of the chlorinated rubber and the acrylic monomer, the Lewis acid and the organic solvent, the chlorinated rubber and the acrylic monomer are polymerized in the organic solvent which contains a polymerization-initiator such as benzoyl peroxide and then the Lewis acid may merely be added thereto and blended.

Regarding the proportion of the chlorinated rubber to the acrylic monomer, the acrylic monomer is necessarily 10–500 parts by weight to 100 parts by weight of the chlorinated rubber because of the above-described reasons, and the Lewis acid is necessarily to be blended in a proportion of 0.1–20 parts by weight to 100 parts by weight of the polymer composed of the chlorinated rubber and the acrylic monomer also because of the above-described reasons.

(c) Adhesive composition comprising a mixture of a chlorinated rubber, an acrylic polymer, a hydrocarbon-type polymer having terminal functional group(s) in the molecule and an organic solvent:

The same chlorinated rubbers, acrylic polymers and organic solvents as exemplified above may be used.

The terminal functional group-containing hydrocarbon-type polymer includes the following embodiments:

(1) Hydrocarbon-type polymers having at least one hydroxyl group in the terminal of the molecule, in which the main chain is saturated or partially saturated.

(2) Polybutadiene polymers and derivatives thereof, containing at least one allylhydroxyl group in the terminal of the molecule.

(3) Hydrocarbon-type polymers having at least one carboxyl group in the terminal of the molecule, in which the main chain is saturated or partially saturated.

(1) Examples of the hydrocarbon-type polymers having at least one hydroxyl group in the terminal of the molecule, in which the main chain is saturated or partially saturated, are a polyhydroxy-polyolefin having at least one hydroxyl group in the terminal of the molecule and having an average molecular weight of 1,000–5,000 (such as "POLITAIL-H" and "POLITAIL-HA" by Mitsubishi Chemical Industried, Ltd.) and a polyhydroxy-polybutadiene polymer having one or more hydroxyl groups, preferably 1.8–5.0 in average, in one monomer molecule and having an average molecular weight of 500–50,000, preferably 1000–20,000, in which the main chain is saturated or partially saturated (such as those as described in Japanese Patent Application OPI No. 142695/75). (The term "OPI" as used herein means an "unexamined and published applicatin".)

(2) The polybutadiene polymers containing at least one allylhydroxyl group in the terminal of the molecule mean polymers having an average molecular weight of 2800 and an OH-value of 42–47 mg KOH. The derivatives of the polybutadiene polymers are those obtained by reaction of the terminal allylhydroxyl group of the polymer with a certain compound having functional group(s). Examples of the derivatives are those obtained by the condensation reaction of the terminal carboxyl group of a compound selected from the following formulae (i) through (iv) or the hydroxyl group of the compound of the following formula (v) with the terminal allylhydroxyl group of the above-described polybutadiene polymer.

(i)

(ii)

-continued

Further examples of the derivatives are intermolecular epoxidated compounds of polybutadiene, represented by the following formula (vi):

(3) The hydrocarbon-type polymers having at least one carboxyl group in the terminal of the molecule, in which the main chain is saturated or partially saturated, are polymers which are synthetized by the method as described in Japanese Patent Application No. 7894/75, that is, as follows: A living polymer is reacted with a halogen-alkyleneoxide and/or a polyepoxide, and the resulting polymer is reacted with a monoepoxide and further reacted with an organic polycarboxylic acid anhydride.

The living polymer is a di-alkali metal polymer having alkali metals in both terminals of the molecule and having a molecular weight of 500–10,000 as obtained by the reaction of a conjugated diolefin and/or a vinyl compound with an alkali metal in a conventional manner.

The above-described halogeno-alkyleneoxide is a compound represented by the following formula, which includes epichlorohydrin.

(in which X represents a halogen).

The polyepoxide is an alkyleneoxide containing two or more epoxy groups in one molecule, such as bisphenol A-glycidyl ether.

The organic polycarboxylic acid anhydride includes aliphatic polycarboxylic acid anhydrides such as maleic anhydride or succinic anhydride, aromatic polycarboxylic acid anhydrides such as phthalic anhydride or pyromellitic anhydride and alicyclic polycarboxylic acid anhydrides such as hexahydrophthalic anhydride or tetrahydrophthalic anhydride.

The adhesive composition comprising the mixture of the chlorinated rubber, acrylic polymer, hydrocarbon-type polymer having terminal functional group(s) in the molecule and organic solvent is prepared merely by blending the above-exemplified chlorinated rubber, acrylic polymer and terminal functional group-containing hydrocarbon-type polymer (1), (2) or (3) in the organic solvent.

The proportion in the admixture of the chlorinated rubber, acrylic polymer and terminal functional group-containing hydrocarbon-type polymer is 10–500 parts by weight of the acrylic polymer and 0.5–500 parts by weight of the hydrocarbon-type polymer to 100 parts by weight of the chlorinated rubber.

In case the proportion of the acrylic polymer is less than 10 parts by weight, the adhesion lowers, but on the contrary, if the proportion thereof is more than 500 parts by weight, the hardness of the resulting adhesive composition becomes too high, and therefore, when this is actually coated on a base, the coated film is brittle.

In case the proportion of the hydrocarbon-type polymer is less than 0.5 parts by weight, the adhesion lowers, and if this is added in an amount of more than 500 parts by weight, any improvement of the adhesion cannot be expected.

(d) Adhesive composition comprising a mixture of a polymer made of a chlorinated rubber and an acrylic monomer, a hydrocarbon-type polymer having terminal functional group(s) in the molecule and an organic solvent:

The same chlorinated rubbers, acrylic monomers, hydrocarbon-type polymers and organic solvents as exemplified above may be used. The adhesive composition of this type may be obtained merely by adding 10–500 parts by weight of the acrylic monomer to 100 parts by weight of the chlorinated rubber in the organic solvent containing a polymerization initiator such as benzoyl peroxide for polymerization and then further adding 0.5–500 parts by weight of the hydrocarbon-type polymer thereto and blending the resulting mixture.

(e) Polyolefin-type polymer bases to which the aforementioned adhesive compositions (a) through (d) may be applied are the afore-mentioned polyolefin-type synthetic resins and polyolefin-type vulcanized rubbers as well as those additionally containing other rubber components (such as SBR, BR, IIR, CR, NBR, IR) or other resin components (such as PP, PE, EVA) in such amount that the characteristics of the original synthetic resin or vulcanized rubber are not deteriorated by the addition of the latter additional components (in general, in an amount of ½ part by weight or less). In general, these polyolefin-type vulcanized rubbers may contain conventional additives, for example, (1) sulfur, morpholine-disulfide, dicumyl peroxide or the like, as a vulcanizing agent, (2) 2-mercaptobenzothiazole, zinc dimethyldithiocarbamate, tetramethylthiuram-disulfide or the like, as a vulcanization-accelerator, (3) phenyl-α-naphthylamine, 2,6-di-t-butyl-p-cresol or the like, as an aging-inhibitor, antioxidant or ozone-deterioration-inhibitor, (4) carbon black, silicic acid hydride, magnesium carbonate, clay or the like, as a filler and (5) dioctyl sebacate, mineral oils or the like, as a plasticizer.

For the application of the afore-mentioned adhesive composition (a) through (d) to these polyolefin-type polymer bases, various conventional coating methods may be utilized, such as dipping, spraying or brush-coating method.

All of these adhesive compositions (a) through (d) are one-bath type liquids and therefore, the pot life thereof is extremely long. In case the viscosity of the adhesive liquid has increased because of the evaporation of the solvent, the solvent may again be added thereto to regulate the viscosity thereof.

The present invention will be explained in greater detail by reference to the following examples which, however, are not intended to be interpreted as limiting the scope of the present invention.

EXAMPLE 1

A chlorinated rubber, an acrylic polymer and a Lewis acid were blended in an organic solvent to obtain adhesive composition No. 1 through No. 10, as mentioned below. ("Part" means "part by weight" hereunder.)

The chlorinated natural rubber (Cl-NR) as used hereunder is "Adeka Chlorinated Rubber" (by Asahi Denka Kogyo KK).

This "Adeka Chrominated Rubber" is a chlorinated rubber as obtained by chlorination of a natural rubber, which is represented by the following formula:

$(C_5H_7Cl_3)_x(C_5H_6Cl_4)_y(C_{10}H_{11}Cl_4)_z$

The molecular weight is about 5,000–100,000, and the chlorine content is 65% or more.

The organic solvent as used hereunder is a mixture solvent of toluene/n-hexane (=1/1).

ADHESIVE-1:
99.9 parts of Cl-NR, 10.0 parts of polymethyl methacrylate and 1.0 part of $AlCl_3$ were blended in 4850 parts of solvent to obtain the adhesive.

ADHESIVE-2:
100.0 parts of Cl-NR, 10.0 parts of polyethyl methacrylate and 5.0 parts of $AlBr_3$ were blended in 4850 parts of solvent to obtain the adhesive.

ADHESIVE-3:
100.0 parts of Cl-NR, 200.0 parts of polyethyl methacrylate and 10.0 parts of $FeCl_3$ were blended in 4850 parts of solvent to obtain the adhesive.

ADHESIVE-4:
99.0 parts of chloroprene rubber, 10.0 parts of polymethyl methacrylate and 0.11 parts of 1N-nitrile acid were blended in 4850 parts of solvent to obtain the adhesive.

ADHESIVE-5:
95.0 parts of chloroprene rubber, 95.5 parts of polyethyl methacrylate and 5.0 parts of 0.1N-sulfuric acid were blended in 4850 parts of solvent to obtain the adhesive.

ADHESIVE-6:
80.0 parts of chloroprene rubber, 160.0 parts of polyethyl methacrylate and 10.0 parts of 0.5N-hydrochloric acid were blended in 4850 parts of solvent to obtain the adhesive.

ADHESIVE-7:
50.0 parts of chloroprene rubber, 50.0 parts of polymethyl acrylate and 10.0 parts of 0.05N-phosphoric acid were blended in 4850 parts of solvent to obtain the adhesive.

ADHESIVE-8:
20.0 parts of chloroprene rubber, 100.0 parts of polypropyl methacrylate and 10.0 parts of 0.1N-pyrophosphoric acid were blended in 4850 parts of solvent to obtain the adhesive.

ADHESIVE-9:
10.0 parts of chloroprene rubber, 10.0 parts of polypropyl acrylate and 1.0 part of 0.1N-hydrobromic acid were blended in 4850 parts of solvent to obtain the adhesive.

ADHESIVE-10:
80.0 parts of chloroprene rubber, 80.0 parts of polymethyl methacrylate and 10.0 parts of 0.1N-nitrous acid were blended in 4850 parts of solvent to obtain the adhesive.

EXAMPLE 2

A chlorinated rubber and an acrylic monomer were polymerized in an organic solvent, and then, a Lewis acid was added and blended to obtain adhesive compositions No. 11 through No. 22, as follows:

The organic solvent as used hereunder is a mixture solvent of toluene/n-hexane (=1/1).

ADHESIVE-11:
100.0 parts of Cl-NR, 100.0 parts of methyl acrylate and 0.05 part of benzoyl peroxide (BPO) were reacted in solvent for 8 hours at 80° C., and then 10.0 parts of $SbCl_3$ and 4850 parts of solvent were added to the resulting viscous liquid and blended, to obtain the adhesive.

ADHESIVE-12:
100.0 parts of Cl-NR, 500.0 parts of propyl methacrylate and 0.05 part of BPO were reacted in solvent for 8 hours at 80° C., and then, 5.0 parts of and 4850 parts of solvent were added to the resulting viscous liquid and blended, to obtain the adhesive.

ADHESIVE-13:
100.0 parts of Cl-NR, 10.0 parts of propyl acrylate and 0.05 part of BPO were reacted in solvent for 8 hours at 80° C., and then, 1.0 part of $AlCl_3$ and 4850 parts of solvent were added to the resulting viscous liquid and blended, to obtain the adhesive.

ADHESIVE-14:
100.0 parts of Cl-NR, 100.0 parts of methyl methacrylate and 0.05 part of BPO were reacted in solvent for 8 hours at 80° C., and then, 1.0 part of $FeCl_3$ and 4850 parts of solvent were added to the resulting viscous liquid and blended to obtain the adhesive.

ADHESIVE-15:
99.9 parts of chloroprene rubber, 10.0 parts of methyl methacrylate and 0.05 part of BPO were reacted in solvent for 8 hours at 80° C., and then, 0.1 part of $AlCl_3$ and 4850 parts of solvent were added to the resulting viscous liquid and blended to obtain the adhesive.

ADHESIVE-16:
99.9 parts of chloroprene rubber, 10.0 parts of methyl methacrylate and 0.05 parts of BPO were reacted in solvent for 8 hours at 80° C., and then, 0.1 part of and 4850 parts of solvent were added to the resulting viscous liquid and blended to obtain the adhesive.

ADHESIVE-17:

95.0 parts of chloroprene rubber, 95.0 parts of ethyl methacrylate and 0.05 part of BPO were reacted in solvent for 8 hours at 80° C., and then, 0.1 part of AlBr$_3$ and 4850 parts of solvent were added to the resulting viscous liquid and blended to obtain the adhesive.

ADHESIVE-18:

80.0 parts of chloroprene rubber, 160.0 parts of ethyl methacrylate and 0.05 part of BPO were reacted in solvent for 8 hours at 80° C., and then, 20.0 part of FeCl$_3$ and 4850 parts of solvent were added to the resulting viscous liquid and blended to obtain the adhesive.

ADHESIVE-19:

50.0 parts of chloroprene rubber, 50.0 parts of methyl acrylate and 0.05 part of BPO were reacted in solvent for 8 hours at 80° C., and then, 4.3 parts of SbCl$_5$ and 4850 parts of solvent were added to the resulting viscous liquid and blended to obtain the adhesive.

ADHESIVE-20:

20.0 parts of chloroprene rubber, 50.0 parts of propyl methacrylate and 0.05 part of BPO were reacted in solvent for 8 hours at 80° C., and then, 1.0 part of and 4850 parts of solvent were added to the resulting viscous liquid and blended to obtain the adhesive.

ADHESIVE-21:

10.0 parts of chloroprene rubber, 1.0 part of propyl acrylate and 0.05 part of BPO were reacted in solvent for 8 hours at 80° C., and then, 1.0 part of PCl$_5$ and 4850 parts of solvent were added to the resulting viscous liquid and blended to obtain the adhesive.

ADHESIVE-22:

80.0 parts of chloroprene rubber, 80.0 parts of ethyl methacrylate and 0.05 part of BPO were reacted in solvent for 8 hours at 80° C., and then, 1.0 part of PCl$_5$ and 4850 parts of solvent were added to the resulting viscous liquid and blended to obtain the adhesive.

EXAMPLE 3

Cl-NR, an acrylic polymer and a hydrocarbon-type polymer having terminal functional group(s) in the molecule were blended in a mixture solvent of toluene/n-hexane (=1/1), to obtain adhesive composition No. 23 through No. 26, as follows:

A hydrocarbon-type polymer having at least one terminal hydroxyl group in the molecule, in which the main chain is saturated or partially saturated, is used hereunder, and this is the afore-mentioned "POLITAIL-H" or "POLITAIL-HA" (by Mitsubishi Chemical Industries, Ltd.).

ADHESIVE-23:

100.0 parts of chloroprene rubber, 49.5 parts of polymethyl methacrylate and 1.0 part of "POLITAIL-H" were blended in 4850 parts of solvent to obtain the adhesive.

ADHESIVE-24:

100.0 parts of Cl-NR, 160.0 parts of polyethyl methacrylate and 20.0 parts of "POLITAIL-HA" were blended in 4850 parts of solvent to obtain the adhesive.

ADHESIVE-25:

Naphthalene/lithium metal/isoprene (=2/40/30, by molar ratio) were reacted in diethylether to obtain a dilithium initiator. Using 0.04 mole of this dilithium initiator, 50.0 g of butadiene was polymerized in cyclohexane to obtain a living polybutadiene having a molecular weight of 1250.

To the living polybutadiene solution were added cyclohexane containing 0.02 molar concentration of epichlorohydrin and then tetrahydrofuran containing 0.08 molar concentration of propyleneoxide, and thereafter the whole was left as such for one night to complete the reaction of the compounds. Afterwards, tetrahydrofuran containing 0.08 molar concentration of phthalic anhydride was added thereto and reacted for 30 minutes at room temperature and then for 3 hours at 70° C.

A stabilizer of 2,6-di-t-butyl-p-cresol was added to the resulting viscous liquid, and this was recrystallized and purified in a mixture solvent of toluene/methanol in a conventional manner, to obtain a carboxyl group-containing polymer having a molecular weight of 2800.

Next, 20.0 parts of the above-obtained carboxyl group-containing polymer, 100 parts of chloroprene rubber and 50.0 parts of polymethyl methacrylate were blended in 4850 parts of solvent to obtain the adhesive.

ADHESIVE-26:

Naphthalene/lithium metal/isoprene (=2/40/30, by molar ratio) were reacted in diethylether to obtain a dilithium initiator. Using 0.04 mole of this dilithium initiator, 50.0 g of butadiene was polymerized in cyclohexane to obtain a living polymer having a molecular weight of 1250.

To the living polybutadiene solution was added tetrahydrofuran containing 0.12 molar concentration of vinylcyclohexane-diepoxide and was left as such for one night to complete the reaction of the compounds. Afterwards, tetrahydrofuran containing 0.08 molar concentration of maleic anhydride was added thereto and reacted for 30 minutes at room temperature and then for 3 hours at 70° C.

A stabilizer of 2,6-di-t-butyl-p-cresol was added to the resulting viscous liquid, and then, this was, after decomposed with hydrochloric acid, recrystallized and purified in a mixture solvent of toluene/methanol in a conventional manner, to obtain a carboxyl group-containing polymer having an average molecular weight of 1900.

Next, 10.0 parts of this carboxyl group-containing polymer, 100.0 parts of Cl-NR and 100.0 parts of polymethyl methacrylate were blended in 4850 parts of solvent, to obtain the adhesive.

EXAMPLE 4

Cl-NR and an acrylic polymer were polymerized in a mixture solvent of toluene/n-hexane (=1/1), and then, a hydrocarbon-type polymer having terminal funcitonal group(s) in the molecule was blended therewith, to obtain adhesive composition No. 27 through No. 36, as described hereunder.

Hydrocarbon-type polymers as used hereunder are polybutadiene polymers each having at least one terminal allylhydroxyl group in the molecule, which are the following polymers (A) through (H):

(A) "R-45HT" (trade name of polybutadiene polymer product by Idemitsu Petro-Chemical Co. The same shall apply to (B) through (H) hereunder.)

This is a terminal hydroxyl group-containing polybutadiene polymer having a hydroxyl content of 0.83 (meq/g), a hydroxyl value of 4.66 (mgKOH/g) and an average molecular weight of 2800.

(B) "R-45M"

This is a terminal hydroxyl group-containing polybutadiene polymer having a hydroxyl content of 0.75 (meq/g), a hydroxyl value of 42.1 (mgKOH/g) and an average molecular weight of 2800.

(C) "Poly bd HTP-4"

This is a polybutadiene polymer derivative having a terminal group of the following structure in the molecule:

$$-OOC-NH-\underset{}{\bigcirc}-\underset{NCO}{CH_2}$$

(D) "Poly bd R-45EPT"

This is a polybutadiene polymer derivative having a terminal group of the following structure in the moelcule:

$$-OCH_2CH\underset{O}{-}CH_2$$

(E) "Poly bd C.B.C"

This is a compound-type polybutadiene polymer comprising the above (A) "R-45HT" and carbon black.

(F) "Poly bd R-45EPI"

This is an innermolecular epoxy compound of polybutadiene polymer represented by the following structural formula:

[structure with epoxide, OH, repeating unit n]

(G) "Poly bd R-45ACR"

This is a polybutadiene polymer derivative having a terminal group of the following structure in the molecule:

$$-OOC-NH-\underset{CH_3}{\bigcirc}-NH-\underset{O}{\overset{O}{\underset{\|}{C}}}-C_2H_4O-\overset{O}{\underset{\|}{C}}-CH=CH_2$$

(H) "Poly bd R-45MA"

This is a maleate derivative of the above (A) "R-45HT".

ADHESIVE-27:

100.0 parts of chloroprene rubber, 100.0 parts of methyl methacrylate and 0.05 part of BPO were reacted in solvent for 8 hours at 80° C., and then, 255 parts of "POLITAIL-H" and 4850 parts of solvent were added to the resulting viscous liquid and blended, to obtain the adhesive.

ADHESIVE-28:

100.0 parts of Cl-NR, 100.0 parts of ethyl acrylate and 0.05 part of BPO were reacted in solvent for 8 hours at 80° C., and then, 255 of "POLITAIL-HA" and 4850 parts of solvent were added to the resulting viscous liquid and blended to obtain the adhesive.

ADHESIVE-29:

100.0 parts of chloroprene rubber, 100.0 parts of propyl methacrylate and 0.05 part of BPO were reacted in solvent for 8 hours at 80° C., and then, 255 parts of "R-45HT" and 4850 parts of solvent were added to the resulting viscous liquid and blended to obtain the adhesive.

ADHESIVE-30:

100.0 parts of Cl-NR, 160.0 parts of propyl acrylate and 0.05 part of BPO were reacted in solvent for 8 hours at 80° C., and then, 255 parts of "R-45M" and 4850 parts of solvent were added to the resulting viscous liquid and blended to obtain the adhesive.

ADHESIVE-31:

100.0 parts of chloroprene rubber, 160.0 parts of n-butyl methacrylate and 0.05 part of BPO were reacted in solvent for 8 horus at 80° C., and then, 255 parts of "Poly bd HTP-4" and 4850 parts of solvent were added to the resulting viscous liquid and blended to obtain the adhesive.

ADHESIVE-32:

100.0 parts of Cl-NR, 160.0 parts of ethyl acrylate and 0.05 part of BPO were reacted in solvent for 8 hours at 80° C., and then, 255 parts of "Poly bd C.B.C" and 4850 parts of solvent were added to the resulting viscous liquid and blended to obtain the adhesive.

ADHESIVE-33:

100.0 parts of chloroprene rubber, 100.0 parts of ethyl methacrylate and 0.05 part of BPO were reacted in solvent for 8 hours at 80° C., and then, 255 parts of "Poly bd R-45MA" and 4850 parts of solvent were added to the resulting viscous liquid and blended to obtain the adhesive.

ADHESIVE-34:

100.0 parts of Cl-NR, 160.0 parts of methyl methacrylate and 0.05 part of BPO were reacted in solvent for 8 at 80° C., and then, 255 parts of "R-45M" and 4850 parts of solvent were added to the resulting viscous liquid and blended to obtain the adhesive.

ADHESIVE-35:

100.0 parts of chloroprene rubber, 160.0 parts of isobutyl methacrylate and 0.05 part of BPO were reacted in solvent for 8 hours at 80° C., and then, 255 parts of "Poly bd R-45EPI" and 4850 parts of solvent were added to the resulting viscous liquid and blended to obtain the adhesive.

ADHESIVE-36:

100.0 parts of Cl-NR, 160.0 parts of ethyl methacrylate and 0.05 part of BPO were reacted in solvent for 8 hours at 80° C., and then, 255 parts of "Poly bd R-45ACR" and 4850 parts of solvent were added to the resulting viscous liquid and blended to obtain the adhesive.

The compositions given in the following Comparative Example No. 1 through No. 9 are conventional adhesive compositions which have heretofore been used for polyolefin-type vulcanized rubbers and polyolefin-type synthetic resins.

COMPARATIVE EXAMPLE 1

"Ester-Resin-20" (saturated polyester resin manufactured by Toyo boseki Co.) was diluted with a mixture solvent of methylethylketone/toluene (=1/9) to prepare a primer composition.

COMPARATIVE EXAMPLE 2

"Vinylite-VMCH" (vinyl chloride/vinyl acetate copolymer resin manufactured by Union Carbide Co.) was diluted with a mixture solvent of methylethylketone/toluene (=1/1) to obtain a primer composition.

COMPARATIVE EXAMPLE 3

"Eslex-BM-2" (butyral resin manufactured by Sekisui Chemical Co.) was diluted with a mixture solvent of butanol/xylene (=1/1) to obtain a primer composition.

COMPARATIVE EXAMPLE 4

"Olyster-M55-80A" (wet-hardening polyurethane resin manufactured by Mitsui Toatsu Chemical Inc.) was diluted with toluene to obtain a primer composition.

COMPARATIVE EXAMPLE 5

A mixture comprising "Desmophen-100" (polyhydroxy compound manufactured by Bayer A.G.)/"Desmodur-R" (polyisocyanate manufactured by Bayer A.G.) (=1/1.5) was diluted with a mixture solvent of methylene glycol/butyl acetate/toluene (=1/1/1), to obtain a primer composition.

COMPARATIVE EXAMPLE 6

"Becozol-J-534" (linseed oil-modified long oil-alkyd resin manufactured by Dai-Nippon Ink & Chemicals, Inc.) and cobalt naphthenate (desiccant) were diluted with a mineral base to obtain a primer composition.

COMPARATIVE EXAMPLE 7

A mixture comprising "Becozol-J-524" (linseed oil-modified long oil-alkyd resin manufactured by Dai-Nippon Ink & Chemicals, Inc.)/"Super-Bekamin J-100" (butylated melamine resin manufactured by Dai-Nippon Ink & Chemicals, Inc.) (=4/1) was diluted with xylene to obtain a primer composition.

COMPARATIVE EXAMPLE 8

A mixture comprising "Acryloid C-110 V" (thermoplastic acrylic resin manufactured by Rhom & Haas Co.)/nitrocellulose (=99/1) was diluted with toluene to obtain a primer composition.

COMPARATIVE EXAMPLE 9

A mixture comprising "Acryldic 47-712" (thermosetting acrylic resin manufactured by Dai-Nippon Ink & Chemicals, Inc.)/"Super-Bekamin 47-508" (butylated melamine resin manufactured by Dai-Nippon Ink & Chemicals, Inc.) (=4/1) was diluted a mixture solvent of toluene/butyl acetate (=1/1) to obtain a primer composition.

Next, the adhesion of each of the above ADHESIVE-1 through ADHESIVE-36 was tested by the following adhesion tests:

Adhesion test-1:

A rubber compound comprising the composition of the following Table-1 was vulcanized for 30 minutes at 160° C. to obtain a base of EPDM, having a thickness of 2 mm. This was cut into two test pieces each having a size of 100 mm×100 mm.

TABLE 1

| | |
|---|---|
| EPDM | 100.0 parts |
| Carbon black | 70.0 parts |
| Mineral oil | 35.0 parts |
| Zinc oxide | 5.0 parts |
| Stearic acid | 1.0 parts |
| Vulcanization-accelerator | 2.0 parts |
| Sulfur | 1.5 parts |

Next, ADHESIVE-1 was coated on one test piece by dipping method and dried for 30 minutes with air at room temperature, and then, the other test piece was stuck thereto.

Thus stuck test piece was left at room temperature for 24 hours and then tensed with a tensile velocity of 30 mm/min for the measurement of the tensile shear strength thereof.

In addition, ADHESIVE-11 through ADHESIVE-14, ADHESIVE-23, ADHESIVE-27 through ADHESIVE-29 and adhesives of the Comparative Examples 1 and 2 were used in the same manner, and the tensile shear strength of each sample was measured under the same condition. The results are given in the following Table-2:

TABLE 2

| Adhesive | Tensile shear strength (kg/18 mm$^2$) |
|---|---|
| ADHESIVE-1 | 20.7 |
| ADHESIVE-11 | 23.6 |
| ADHESIVE-12 | 19.6 |
| ADHESIVE-13 | 20.3 |
| ADHESIVE-14 | 18.3 |
| ADHESIVE-23 | 19.0 |
| ADHESIVE-27 | 18.4 |
| ADHESIVE-28 | 19.8 |
| ADHESIVE-29 | 20.5 |
| Comparative Example-1 | 1.2 |
| Comparative Example-2 | 0.9 |

Adhesion Test-2:

Each of ADHESIVE-2 through ADHESIVE-4, ADHESIVE-15 through ADHESIVE-17, ADHESIVE-24, ADHESIVE-30 through ADHESIVE-32 and adhesives of the Comparative Examples 3 and 4 was coated on the surface of the same test piece of EPDM as above by dipping method and dried for 24 hours with air at room temperature.

Afterwards, the adhesion of the adhesive coated on each test piece was measured by means of a cross-cut tape-peeling test, and as the result thereof, the adhesion of each of the ADHESIVE-2 through ADHESIVE-4, ADHESIVE-15 through ADHESIVE-17, ADHESIVE-24 and ADHESIVE-30 through ADHESIVE-32 was sufficient (100/100), while the adhesion of the adhesives of the Comparative Examples 3 and 4 was extremely poor (0/100).

The results of the above Adhesion Test-1 and -2 prove that the adhesion of the ADHESIVE-1 through ADHESIVE-4, ADHESIVE-11 through ADHESIVE-17, ADHESIVE-23, ADHESIVE-24, ADHESIVE-27 through ADHESIVE-32 to EPDM is far higher than that of the adhesives of the Comparative Examples 1-4.

Adhesion Test-3:

A vinyl chloride resin comprising the composition of the following Table-3 was extruded and moulded at 170° C. to obtain a base of 2 mm thick, and this was cut into two test pieces each having a size of 100 mm×100 mm.

TABLE 3

| | |
|---|---|
| Polyvinyl choloride (polymerization degree: 1450) | 100.0 parts |
| Dioctyl phthalate | 80.0 parts |
| Epoxidated soybean oil | 3.0 parts |
| Stabilizer | 4.5 parts |

Next, ADHESIVE-5 was coated on one test piece by dipping method and dried for 30 minutes with air at room temperature, and then, the other test piece was stuck thereto.

Thus stuck test piece was left at room temperature for 24 hours and then tensed with a tensile velocity of 30 mm/min for the measurement of the tensile shear strength thereof.

In addition, ADHESIVE-6, ADHESIVE-7, ADHESIVE-18, ADHESIVE-19, ADHESIVE-33 and ADHESIVE-34 and adhesives of the Comparative Examples 5 and 6 were used in the same manner, and the tensile shear strength of each sample was measured under the same condition. The results are given in the following Table-4.

TABLE 4

| Adhesive | Tensile shear strength (kg/18 mm²) |
|---|---|
| ADHESIVE-5 | 18.1 |
| ADHESIVE-6 | 20.0 |
| ADHESIVE-7 | 16.9 |
| ADHESIVE-18 | 19.4 |
| ADHESIVE-19 | 20.7 |
| ADHESIVE-33 | 17.8 |
| ADHESIVE-34 | 19.8 |
| Comparative Example-5 | 1.1 |
| Comparative Example-6 | 1.3 |

Adhesion Test-4:

Each of ADHESIVE-8, ADHESIVE-20, ADHESIVE-25, ADHESIVE-35 and adhesives of the Comparative Examples No. 7-9 was coated on the surface of the same test piece made of vinyl chloride resin as above by dipping method and dried for 24 hours with air at room temperature.

Afterwards, the adhesion of the adhesive coated on each test piece was measured by means of a cross-cut tape-peeling test, and as the result thereof, the adhesion of each of the ADHESIVE-8, ADHESIVE-20, ADHESIVE-25 and ADHESIVE-35 was sufficient (100/100), while the adhesion of the adhesives of the Comparative Examples No. 7-9 was extremely poor (0/100).

The results of the above Adhesion Test-3 and -4 prove that the adhesion of the ADHESIVE-5 through ADHESIVE-8, ADHESIVE-18 through ADHESIVE-20, ADHESIVE-25 and ADHESIVE-33 through ADHESIVE-35 to vinyl chloride resin is far higher than that of the adhesives of the Comparative Examples No. 5-9.

Next, some Use Examples are given below, where the adhesive compositions of the present invention are actually used as a subbing agent for the application of a paint coating material or an adhesive to various kinds of rubber materials for car parts.

USE EXAMPLE 1

(Door Weather Strip)

A door weather strip for sealing the gap between the body and the door of a car is generally made of a material EPDM.

ADHESIVE-9 was coated on the surface of a weather strip base formed by extrusion moulding of the EPDM comprising the composition of the above Table-1, by dipping method, and dried with air at room temperature for 30 minutes. Next, an urethane coating material comprising the composition of the following Table-5 was coated on the surface thereof and dried with air at room temperature for 1 hour, and further, 5 wt.%-toluene solution of dimethylsilicone oil (100,000 cSt) was sprayed thereover.

TABLE 5

| | |
|---|---|
| Urethane prepolymer | 140.0 parts |
| Castor oil-polyol (OH value = 80) | 14.0 parts |
| Silicone oil | 32.0 parts |
| Ethylene tetrafluoride resin | 32.0 parts |
| Carbon black | 2.0 parts |
| Dibutyl-tin-dilaurate | 0.52 part |
| Toluene, cyclohexanone, trichloroethane tetrachloroethane | 552.8 parts |

In the above coating material composition, the urethane prepolymer was formed by reacting each of the compositions of the following Table-6 and Table-7, individually, in a dry nitrogen gas for 30 minutes at 80° C. and then blending the resulting reaction products in a proportion of 100/40 ( by weight ratio).

TABLE 6

| | |
|---|---|
| Polyester-polyol comprising 1,4-butanediol and adipic acid | 1000.0 parts |
| 4,4'-diphenylmethane diisocyanate | 100.0 parts |
| Toluene | 2000.0 parts |

TABLE 7

| | |
|---|---|
| Trimethylol-propane | 100.0 parts |
| 4,4'-diphenylmethane diisocyanate | 553.0 parts |
| Ethyl acetate | 487.0 parts |

USE EXAMPLE 2

(Glass-run)

A glass-run to be used in the part where a window glass slides in a door sash of a car is generally made of a material of EPDM.

ADHESIVE-21 was coated on the surface of a glass-run base formed by extrusion moulding of the EPDM comprising the composition of the above Table-1 and dried with air at room temperature for 30 minutes. Next, a chloroprene-type adhesive comprising the composition of the following Table-8 was coated on the surface thereof and dried with air at room temperature for 24 hours.

TABLE 8

| | |
|---|---|
| Chloroprene rubber | 100.0 parts |
| 4,4',4''-triphenylmethane triisocyanate | 10.0 parts |
| Mixture solvent of toluene/methylethylketone (= 1/1) | 300.0 parts |
| Methylene chloride | 40.0 parts |

Next, the film formed on the surface of each of the weather-strip and the glass-run, which were processed as above, was subjected to an abrasion-resistance test, as follows:

| Testing machine | KI-type Abrasion Testing Machine |
|---|---|
| Test Condition | |
| abradant | glass (thickness: 5 mm) |
| Load | 3 kg |
| cycle of abradant | 60 times/min. |
| stroke of abradant | 145 mm |

Test Method:

A part of each of the above weather-strip and glass-run was installed in the testing machine, and the surface of the coated film was rubbed under the test conditon as mentioned above.

As the result, the exposure of the base body did not occur in every case, after repeated friction of 50,000 times.

Next, the test pieces were subjected to a 180°-bending test for the observation of the compatibility of the coated film to the base body, with the result that every case showed an extremely high compatibility. The result of this test means that the characteristics of the EPDM (such as high flexibility and high bending-resistance) are not deteriorated at all by the provision of the coat films thereon.

On the other hand, the adhesives of the Comparative Examples No. 1-9, which have heretofore been used as a subbing agent for rubbers, were used in the same manner as above, and the samples were subjected to the same abrasion-resistance test. As the result, the base body was bared out after repeated friction of 100-150 times, in the samples of both weather-strip and glass-run.

USE EXAMPLE-3

(Products of electrostatic fiber-implantation)

A glass-run is known, made of a product of electrostatic fiber-implantation, which is applied to the surface of sliding on a window-glass of a car.

The same glass-run base as mentioned above was dipped in ADHESIVE-26 and then dried with air at room temperature for 30 minutes. Next, an urethane adhesive material obtained by reaction of the composition of the following Table-9 in a dry nitrogen gas for 3 hours at 80° C. was coated on the surface of the adhesive coat, and then, piles of Nylon-66 short fibers were implanted thereon by electrostatic fiber-implantation. After the implantation, the urethane adhesive was hardened with a hot air, to obtain a product of electrostatic fiber-implantation.

TABLE 9

| Polypropylene-glycol (molecular weight: 1000) | 100.0 parts |
|---|---|
| 4,4'-diphenylmethane diisocyanate | 100.0 parts |
| Ethylene-glycol | 0.62 part |
| Toluene | 201.0 parts |

Next, the coat formed on the fiber-implanted product, which was processed as above, was subjected to an abrasion-resistance test, as follows:

| Testing machine | Reciprocation-type Abrasion Testing Machine |
|---|---|
| Test Condition | |
| abradant | glass (thickness: 5 mm) |
| cycle of abradant | 60 times/min. |

-continued

| stroke of abradant | 145 mm |
|---|---|

Test Method:

A part of the electrostatic fiber-implanted product was installed in the testing machine, and the surface of the coat was rubbed under the test condition as mentioned above.

As the result, the exposure of the base body did not occur after repeated friction of 20,000 times.

The adhesive compositions of the present invention may further be applied to various uses as mentioned below.

USE EXAMPLE 4

(Diaphragm)

ADHESIVE-36 was coated on the surface of an NBR diaphragm base and dried with air at room temperature for 30 minutes, and then, the urethane-coating material comprising the composition of the above Table-5 was coated thereover.

In order to test the gasoline-resistance of the NBR diaphragm thus coated, this was dipped in a gasoline of 24° C. for 48 hours, together with a non-coated diaphragm (for comparison), and then, the weight variation of each sample before and after the dipping was measured in accordance with the following formula:

$$\Delta W = [(W_2 - W_1)/W_1] \times 100 \; (\%)$$

(where $W_1$ represents the weight before the dipping; and $W_2$ represents the weight after the dipping).

As the result, $\Delta W$ was 29.5% in the case of the non-coated diaphragm, while $\Delta W$ lowered to 20.8% in the case of the coated diaphragm. This result proves that ADHESIVE-36 is extremely effective for the improvement of the gasoline-resistance of the diaphragm.

USE EXAMPLE 5

(Brake cylinder cup)

ADHESIVE-10 was coated on the surface of an SBR brake cylinder cup base and dried with air at room temperature for 30 minutes, and then, the urethane-coating material comprising the composition of the above Table-5 was coated thereover.

In order to test the glycol-resistance of the SBR brake cylinder cup thus coated, this was dipped in a commercial low molecular ethylene-glycol at 24° C. for 200 hours, together with a non-coated brake cylinder cup (for comparison), and then, the weight variation ($\Delta W$) of each sample before and after the dipping was measured in the same manner as the case of the above diaphragm.

As the result, $\Delta W$ was 3.5% in the case of the non-coated brake cylinder cup, while $\Delta W$ lowered to 1.6% in the case of the coated brake cylinder cup. This result proves that ADHESIVE-10 is extremely effective for the improvement of the glycol-resistance of the brake cylinder cup.

USE EXAMPLE 5

(Wiper Blade)

ADHESIVE-22 was coated on the surface of a wiper blade formed by extrusion moulding of the EPDM comprising the composition of the above Table-1, and dried with air at room temperature for 30 minutes, and then, the urethane-coating material comprising the composition of the above Table-5 was coated thereover. The compatibility of the adhesive to the urethane-coating material was excellent, and the friction-resistance in the sliding of the wiper blade thus coated was low.

USE EXAMPLE 6

(Resin molding)

A molding is installed to the side surface of a car body via a both-side adhesive tape made of a base of polyethylene-foam.

Figure 1:
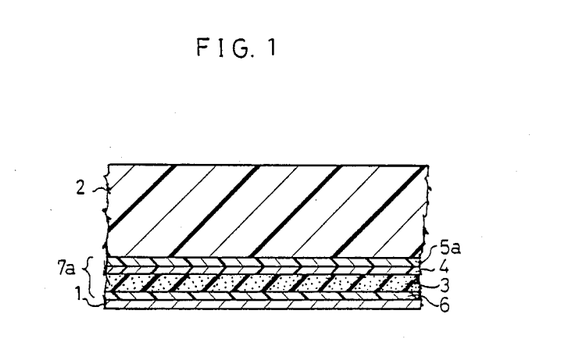
FIG. 1 and FIG. 2 attached hereto are cross-sectional views each to show a structure of a molding as obtained by the use of the adhesive composition of the present invention.

The vinyl chloride resin comprising the composition of the above Table-3 was extruded at 170° C. to obtain a molding. Using this, the following tests were carried out:

(i) FIG. 1 is referred to. A primer (4) of ADHESIVE-9 was coated on one surface of a tape (3) made of a polyethylene-foam (five time-magnification foam) and then an adhesive (5a) of "G-17" (=chloroprene rubber adhesive manufactured by Konishi) was coated thereover. A commercial acrylic adhesive (6) for a both-side adhesive tape was coated on the other opposite surface of the foam, to obtain a both-side adhesive tape (7a). Next, a vinyl chloride resin molding (2) was stuck to the surface of an acrylic-coated iron plate (1) via the both-side adhesive tape (7a).

(ii) ADHESIVE-10 was used instead of the primer of the above (i), and others were same as those of the above (i).

(iii) ADHESIVE-21 was used instead of the primer of the above (i), and others were same as those of the above (i).

Figure 2:
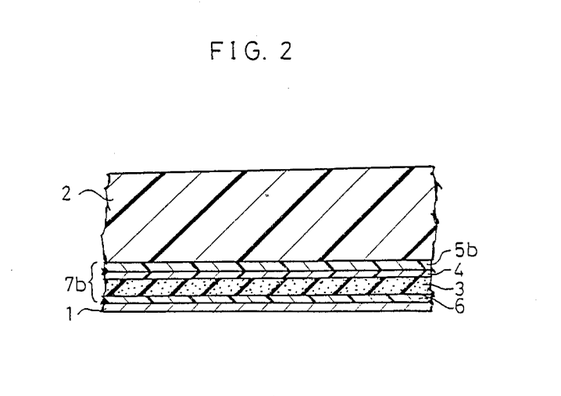

(iv) FIG. 2 is referred to. A primer (4) of ADHESIVE-22 was coated on one surface of a tape (3) made of a polyethylene-foam (five time-magnification foam) and then, an adhesive (5b) of "Daiyanal-882" (=acrylic adhesive manufactured by Mitsubishi Rayon Co.) was coated thereover. A commercial acrylic adhesive (6) for a both-side adhesive tape was coated on the other opposite surface of the foam, to obtain a both-side adhesive tape (7b). Next, a vinyl chloride resin molding (2) was stuck to the surface of an acrylic-coated iron plate (1) via the both-side adhesive tape (7b).

(v) ADHESIVE-26 was used instead of the primer of the above (iv), and others were same as those of the above (iv).

(vi) ADHESIVE-36 was used instead of the primer of the above (iv), and others were same as those of the above (iv).

(vii) Comparative Example 10: The adhesive (5a) of the above "G-17" only was coated on one surface of the polyethylene-foam tape (3) (five time-magnification foam tape), and others were same as those of the above (i).

(viii) Comparative Example 11: The adhesive (5b) of the above "Daiyanal-882" only was coated on one surface of the polyethylene-foam tape (3) (five time-magnification foam tape), and others were same as those of the above (iv).

Next, each molding (2) in the above (i) through (viii) was subjected to a tensile-shearing test under the condition of a tensile velocity of 30 mm/min. The results are given in the following Table-10.

TABLE 10

| Tensile Shear Strength (kg/cm$^2$) | | | |
|---|---|---|---|
| (i) | 1.11 | (v) | 1.15 |
| (ii) | 1.22 | (vi) | 1.16 |
| (iii) | 1.09 | (vii) | 0.25 |
| (iv) | 1.18 | (viii) | 0.31 |

The above test results prove that the ADHESIVE-9, ADHESIVE-10, ADHESIVE-21, ADHESIVE-22, ADHESIVE-26 and ADHESIVE-36 are extremely useful as a primer in the coating of a coating paint material or an adhesive on EPDM and vinyl chloride resin.

Further, the adhesive compositions (e) through (g) as mentioned hereunder also have a strong and firm adhesion to polyolefin-type vulcanized rubbers, polyolefin-type synthetic resins and vinyl chloride resins, like the afore-mentioned ADHESIVE-1 through ADHESIVE-36.

(e) Adhesive composition comprising a mixture of a non-vulcanized rubber compound, a hydrocarbon-type polymer having terminal functional group(s) in the molecule, a halogenating agent and a solvent:

The non-vulcanized rubber compound is a viscous composition obtained by diluting a non-vulcanized natural rubber or a non-vulcanized synthetic rubber such as EPDM, EPM, SBR, BR, IIR, CR, NBR or IR with a solvent.

The hydrocarbon-type polymer having terminal functional group(s) in the molecule includes the embodiments of (1) hydrocarbon-type polymers having at least one hydroxyl group in the terminal of the molecule, in which the main chain is saturated or partially saturated, (2) polybutadiene polymers and derivatives thereof, containing at least one allylhydroxyl group in the terminal of the molecule and (3) hydrocarbon-type polymers having at least one carboxyl group in the terminal of the molecule, in which the main chain is saturated or partially saturated, as described above.

In case, the above (2) polybutadiene polymers or derivatives thereof, containing at least one allylhydroxyl group in the terminal of the molecule, are used, the afore-mentioned non-vulcanized rubber compound may not be added to the present adhesive composition.

The halogenating agent comprises at least one selected from the following groups (i) through (iii):

(i) Compounds having a bond of in the molecule, in which X is a halogen.

(ii) Alkyl hypohalides.

(iii) Hypohalites.

The Compounds having a bond of in the molecule (in which X is a halogen) include, for example, halogeno-succinimides such as N-bromo-succinimide, isocyanuric acid halides such as trichloro-isocyanurate or dichloro-isocyanurate and halogeno-hydantoins such as dichlorodimethylhydantoin.

The alkyl hypohalides include, for example, normal-, secondary- or tertiary-alkyl hypohalides, preferably stable tertiary-alkyl hypohalides such as tert-butyl or tert-amyl hypochloride or hypobromide.

The hypohalites include, for example, sodium, potassium or calcium hypochlorite or hypobromite.

Further, in addition to the above-exemplified halogen-compounds, other various kinds of halogen-containing substances may be used, for example, chlorine or bromine or an aqueous solution thereof; a mixture of a hypohalite and an organic acid (Japanese Patent Publication No. 52216/82); antimony pentafluoride (Japanese Patent Application OPI No. 23483/75); a mixture solution comprising an alkali metal or alkaline earth metal aqueous solution, sulfur fluoride and bromine (Japanese Patent Publication No. 27751/78); a mixture of iodine and potassium iodide (Japanese Patent Publication No. 27751/78); an aqueous mixture solution comprising a halogeno-oxyacid salt and a concentrated hydrochloric acid (Japanese Patent Publication No. 22103/71); and an aqueous mixture solution comprising an alkali bromide and a peroxy-disulfuric acid.

For the preparation of the adhesive composition, the non-vulcanized rubber compound, the terminal functional group-containing hydrocarbon-type polymer ((1) or (3)) and the halogenating agent, which are exemplified in the above, may merely be blended in a solvent in a predetermined proportion of each component. In particular, 0.01–10 parts by weight of the halogenating agent is preferably blended with 100 parts weight (solid content) of the non-vulcanized rubber compound. If the amount of the halogenating agent is less than 0.01 part by weight, the adhesion is poor, but on the contrary, if the amount thereof is more than 10 parts by weight, any further improvement of the adhesion cannot be attained. The proportion of the terminal functional group-containing hydrocarbon-type polymer ((1) or (3)) to be incorporated in the composition is preferably 500–1000 parts by weight to 100 parts by weight of the solid content of the non-vulcanized rubber compound.

In case the polybutadiene polymer or derivative thereof (2) which contains at least one allylhydroxyl group in the terminal of the molecule is used as the hydrocarbon-type polymer, the proportion of the halogenating agent to be incorporated is preferably 0.01–300 parts by weight to 100 parts by weight of the polymer (2). If the amount of the halogenating agent is less than 0.01 part by weight, the adhesion is poor, but on the contrary, if the amount thereof is more than 300 parts by weight, any further improvement of the adhesion cannot be attained.

In case the compound containing a bond of (in which X is a halogen) is used as the halogenating agent, the components of the adhesive composition are blended in an organic solvent selected from the group consisting of aromatic hydrocarbons such as benzene, toluene and xylene; ethers such as dioxane and tetrahydrofuran; acetates such as methyl acetate, butyl acetate and isopropyl acetate; ketones such as methylethylketone, acetone and cyclohexanone; and chlorinated hydrocarbons such as ethyl chloride, chloroform and carbon tetrachloride. A mixture solvent comprising two or more of these solvents may also be used. Further, any other organic solvents which do not react with the halogenating agent may also be used.

In case the hypohalites are used, the solvent is water. In this case, therefore, an emulsifier is added to the mixture comprising the non-vulcanized rubber compound and the terminal functional group-containing hydrocarbon-type polymer to obtain a latex, and thereafter the hypohalite is added thereto and blended, whereby a desired adhesive composition may be obtained.

In case the alkyl hypohalides are used as the halogenating agent, any of water and organic solvents may be used as the solvent.

Regarding the amount of the solvent to be added, it is preferred that the solvent is added in such amount that the solid concentration in the mixture may be 30% or less. If the solid concentration is more than 30%, the stability of the mixture lowers, which will result in the formation of solid precipitates. The afore-mentioned adhesive compositions are one-bath type liquids and therefore, the pot life thereof is extremely long. In case the viscosity of the adhesive liquid has increased because of the evaporation of the solvent, the solvent may again be added thereto to properly regulate the viscosity thereof.

The following ADHESIVE-37 through ADHESIVE-41 are examples of the present adhesive compositions:

ADHESIVE-37:
100.0 parts of non-vulcanized EPDM, 1.0 part of trichloroisocyanurate and 500.0 parts of "POLITAIL-H" were blended in 9500.0 parts of n-hexane.

ADHESIVE-38:
100.0 parts of non-vulcanized SBR, 1.0 part of N-bromo-succinimide and 500.0 parts of "POLITAIL-H" were blended in 9500.0 parts of toluene.

ADHESIVE-39:
100.0 parts of non-vulcanized NBR, 1.0 part of t-butyl hypohalide and 1000.0 parts of "POLITAIL-HA" were blended in 9500.0 parts of toluene.

ADHESIVE-40:
100.0 parts of polybutadiene polymer ("R-45HT") (having hydroxyl content of 0.83 (meq/g), hydroxyl value of 46.6 (mgKOH/g) and average molecular weight of 2800) and 20.0 parts of trichloro-isocyanurate were blended in 1900.0 parts of ethyl acetate.

ADHESIVE-41:
100.0 parts of polybutadiene polymer ("R-45M") (having hydroxyl content of 0.75 (meq/g), hydroxyl value of 42.1 (mgKOH/g) and average molecular weight of 2800) and 100.0 parts of N-bromo-succinimide were blended in 1900.0 parts of toluene.

The adhesion of these ADHESIVE-37 through ADHESIVE-41 was measured by means of a tensile-shearing test, which was carried out in the same manner as the afore-mentioned Adhesion Test-1.

First, ADHESIVE-37 was coated on one of the two test pieces made of the EPDM comprising the composition of the above Table-1, by dipping method, and dried with air at room temperature for 30 minutes, and then, the other test piece was stuck thereto.

Thus stuck test piece was left at room temperature for 24 hours and then tensed with a tensile velocity of 30 mm/min for the measurement of the tensile shear strength thereof.

In addition, the other ADHESIVE-38 through ADHESIVE-41 were used in the same manner, and the tensile shear strength of each sample was measured under the same condition. The results are given in the following Table-11:

TABLE 11

| Adhesive | Tensile shear strength (kg/18 mm²) |
|---|---|
| ADHESIVE-37 | 16.7 |
| ADHESIVE-38 | 18.4 |
| ADHESIVE-39 | 18.0 |
| ADHESIVE-40 | 17.8 |
| ADHESIVE-41 | 17.1 |

(f) Adhesive composition comprising a mixture of a chlorosulfonated polyolefin, a hydrocarbon-type polymer having terminal functional group(s) in the molecule and an organic solvent:

The chlorosulfonated polyolefin is, for example, a rubber-like substance obtained by reacting a polyolefin with $SO_2Cl_2$ in a conventional manner, including a chlorosulfonated polyethylene or a chlorosulfonated polypropylene. The chlorosulfonated polyolefin preferably has a chlorination degree of 5–80%, most preferably 10–40%, in view of the adhesion of the adhesive composition to polyolefin-type vulcanized rubbers and polyolefin-type synthetic resins.

If the chlorination degree is less than 5% or more than 80%, the adhesion is poor.

The hydrocarbon-type polymer having terminal functional group(s) in the molecule includes the embodiments of (1) hydrocarbon-type polymers having at least one hydroxyl group in the terminal of the molecule, in which the main chain is saturated or partially saturated, (2) polybutadiene polymers and derivatives thereof, containing at least one allylhydroxyl group in the terminal of the molecule and (3) hydrocarbon-type polymers having at least one carboxyl group in the terminal of the molecule, in which the main chain is saturated or partially saturated, which are described hereinbefore.

For the preparation of the adhesive composition of this type, the chlorosulfonated polyolefin and the terminal functional group-containing hydrocarbon-type polymer, which are exemplified above, may merely be blended in an organic solvent in a pre-determined proportion of each component.

In particular, 10–9900 parts by weight of the chlorosulfonated polyolefin is preferably blended with 100 parts by weight of the terminal functional group-containing hydrocarbon-type polymer. If the amount of the chlorosulfonated polyolefin is less than 10 parts by weight, the adhesion is poor, but on the contrary, if the amount thereof is more than 9900 parts by weight, any further improvement of the adhesion cannot be attained.

The organic solvent to be used in the admixture of these components is selected from the above-exemplified various kinds of organic solvents. A mixture solvent comprising two or more of the solvents may also be used. The adhesive composition of this type is a one-bath type liquid, and therefore, the pot life thereof is extremely long. In case the viscosity of the adhesive liquid has increased because of the evaporation of the solvent, the solvent may again be added thereto to properly regulate the viscosity thereof.

The following ADHESIVE-42 through ADHESIVE-44 are examples of the present adhesive compositions:

ADHESIVE-42:

100.0 parts of chlorosulfonated polyethylene (chlorination degree: 10%) and 400.0 parts of "POLITAIL-H" were blended in 9500.0 parts of toluene.

ADHESIVE-43:

900.0 parts of chlorosulfonated polyethylene (chlorination degree: 50%) and 100.0 parts of "POLITAIL-H" were blended in 9500.0 parts of toluene.

ADHESIVE-44:

4500.0 parts of chlorosulfonated polyethylene (chlorination degree: 80%) and 100.0 parts of "POLITAIL-HA" were blended in 9500.0 parts of toluene.

The adhesion of these ADHESIVE-42 through ADHESIVE-44 was measured by means of a tensile-shearing test, which was carried out in the same manner as the afore-mentioned Adhesion Test-1. The results are given in the following Table-12:

TABLE 12

| Adhesive | Tensile shear strength (kg/18 mm²) |
|---|---|
| ADHESIVE-42 | 17.8 |
| ADHESIVE-43 | 18.0 |
| ADHESIVE-44 | 17.7 |

(g) Adhesive composition comprising a mixture of 100 parts by weight of a polydimethylsiloxane having a molecular weight of 5,000–10,000,000, 30–300 parts by weight of a network-structural polysiloxane, which is represented by the following structural formula and which has a molecular weight of 100–1,000,000, and an organic solvent:

(in which R represents a siloxane residue; and $m/n = 0.5–5/1$).

The polydimethylsiloxane as contained in this adhesive composition is a linear polymer having a molecular weight of 5,000–10,000,000, which preferably has a viscosity of 100,000–500,000 cSt.

If the molecular weight of the polydimethylsiloxane is less than 5,000, this gradually becomes lubricant, but on the contrary, if the molecular weight thereof is more than 10,000,000, this becomes rubber-like and elastic. Anyway, these polydimethylsiloxanes of such lower molecular weight or of such higher molecular weight are unsuitable because the adhesion of the adhesive composition is poor.

The polysiloxane having the structural formula:

is a polymer of network structure having a molecular weight of 100–1,000,000; and this contains the group of the formula:

in the terminal of the siloxane skeleton of the formula:

(in which the ratio of m/n falls within the range of 0.5–5/1). A part of the methyl group in the above formula may be substituted by vinyl group or phenyl group.

If the ratio of m/n is less than 0.5, the viscosity is low, but on the contrary, if the ratio thereof is more than 5, the hardness becomes too high. Anyway, these cases falling outside the range of the said ratio are unsuitable as the adhesion of the adhesive composition is poor.

The molecular weight of these polymers is a styrene-calculated molecular weight, as measured in tetrahydrofuran by the use of "FLC-A-700" (column: Shodex-A-80M)(manufactured by Nippon Bunko-sha).

For the preparation of the adhesive composition of this type, 100 parts of the polydimethylsiloxane and 30–300 parts by weight of the polysiloxane of the aforementioned formula may merely be blended in an organic solvent. If the amount of the polysiloxane is less than 30 parts by weight or more than 300 parts by weight, the adhesion of the adhesive composition is poor.

The organic solvent to be used in the admixture of these components is selected from the above-exemplified various kinds of organic solvents. A mixture solvent comprising two or more of the solvents may also be used. The adhesive composition of this type is a one-bath type liquid, and therefore, the pot life thereof is extremely long. In case the viscosity of the adhesive liquid has increased because of the evaporation of the solvent, the solvent may again be added thereto to properly regulate the viscosity thereof.

The following ADHESIVE-45 through ADHESIVE-48 are examples of the present adhesive compositions:

ADHESIVE-45:

100 parts of polydimethylsiloxane having a molecular weight of about 500,000 and 150 parts of polysiloxane having the following formula and having a molecular weight of about 100,000 were diluted with toluene and blended, the solid content of the resulting adhesive composition being 40%.

(in which R is siloxane and the same shall apply hereinafter; m/n=½).

ADHESIVE-46:

100 parts of polydimethylsiloxane having a molecular weight of about 50,000 and 30 parts of polysiloxane having the following formula and having a molecular weight of about 500,000 were diluted with toluene and blended, the solid content of the resulting adhesive composition being 40%.

(in which m/n=1/0.5).

ADHESIVE-47:

100 parts of polydimethylsiloxane having a molecular weight of about 10,000,000 and 300 parts of polysiloxane having the following formula and having a molecular weight of about 1,000,000 were diluted with toluene and blended, the solid content of the resulting adhesive composition being 40%.

(in which m/n=1/5).

ADHESIVE-48:

100 parts of polydimethylsiloxane having a molecular weight of about 100,000 and 100 parts of polysiloxane having a molecular weight of about 500,000 and having the following structural formula:

(in which m/n=1/1.9), which contained 5.2×10 mole/g of vinyl group-containing polysiloxane having a molecular weight of about 100,000 and having the following structural formula:

(in which m/n=1/1.9), were diluted with toluene and blended, the solid content of the resulting adhesive composition being 40%.

The adhesion of these ADHESIVE-45 through ADHESIVE-48 was measured by means of a tensile-shearing test, which was carried out in the same manner as the afore-mentioned Adhesion Test-3.

ADHESIVE-45 was coated on one of the two test pieces made of the vinyl chloride resin comprising the composition of the above Table-3, by dipping method, and dried with air at room temperature for 30 minutes, and then, the other test piece was stuck thereto.

The other ADHESIVE-46 through ADHESIVE-48 were used in the same manner, and the tensile shear strength of each sample was measured under the same condition in the Adhesion Test-3. The results are given in the following Table-13:

TABLE 13

| Adhesive | Tensile shear strength (kg/18 mm$^2$) |
| --- | --- |
| ADHESIVE-45 | 17.1 |
| ADHESIVE-46 | 18.2 |
| ADHESIVE-47 | 18.2 |
| ADHESIVE-48 | 17.7 |

As apparent from the above, the adhesive compostion (e) through (g) have extremely strong and high adhesion, which is almost comparable to that of the other adhesive compostion (a) through (d).

While the invention has been described in detail and with reference to specific embodiments thereof, it will be apparent to one skilled in the art that various changes and modifications can be made therein without departing from the spirit and scope thereof.

What is claimed is:

1. An adhesive composition comprising a mixture of a chlorinated natural rubber, an acrylic polymer, an inorganic Lewis acid and an organic solvent,
   wherein the chlorinated natural rubber has a molecular weight of 5,000–100,000 and a chlorination degree of 65% or more, the proportion of the acrylic polymer is 10–500 parts by weight to 100 parts by weight of the chlorinated natural rubber, and the proportion of an inorganic Lewis acid is 0.1–20 parts by weight to 100 parts by weight of the total of the chlorinated natural rubber and the acrylic polymer.

* * * * *